Dec. 20, 1966 J. E. HERRICK 3,292,207
MACHINE FOR AUTOMATICALLY MAKING MEATBALLS AND THE LIKE
Filed June 8, 1964 4 Sheets-Sheet 1
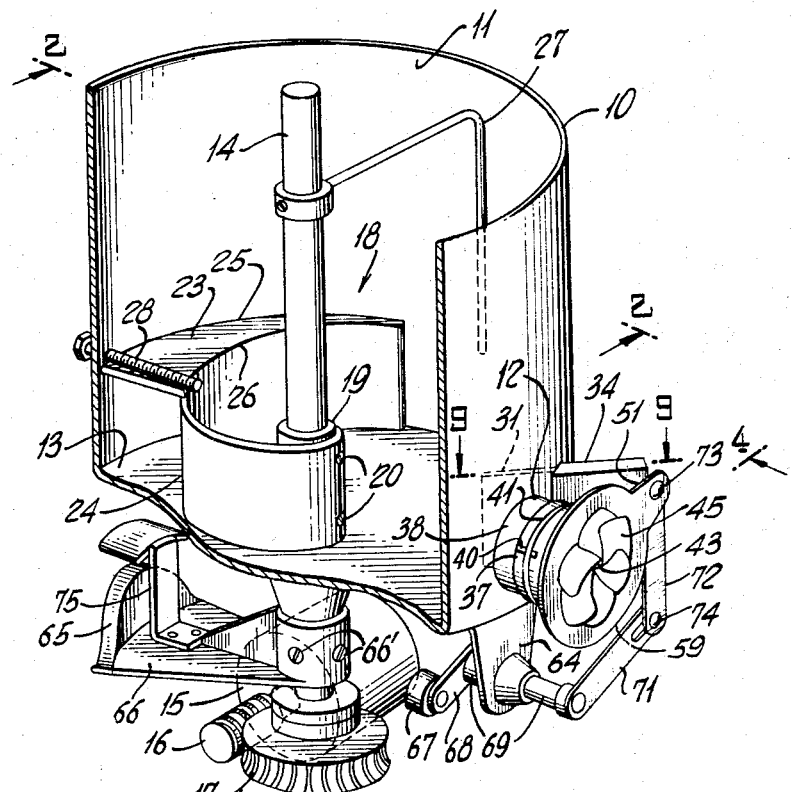
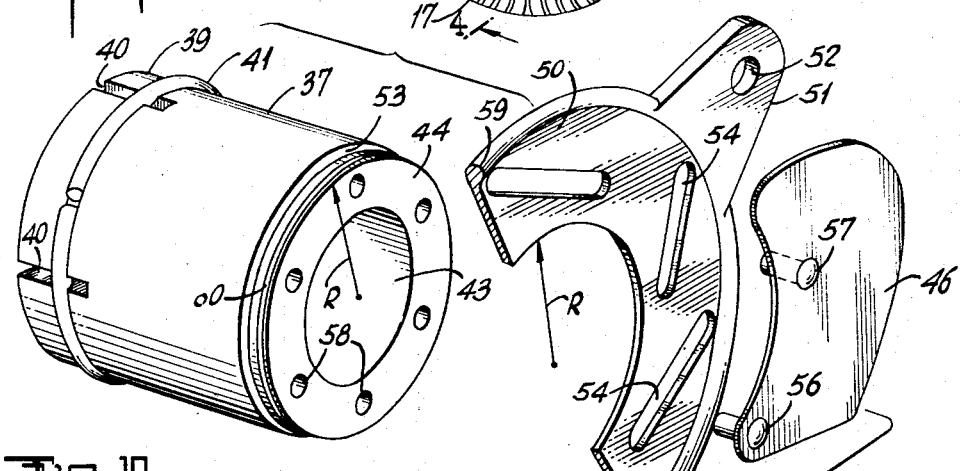
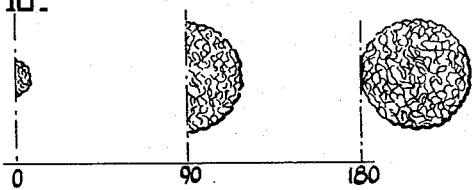
INVENTOR
JAMES E. HERRICK
BY
Hopgood & Calimafde
ATTORNEYS

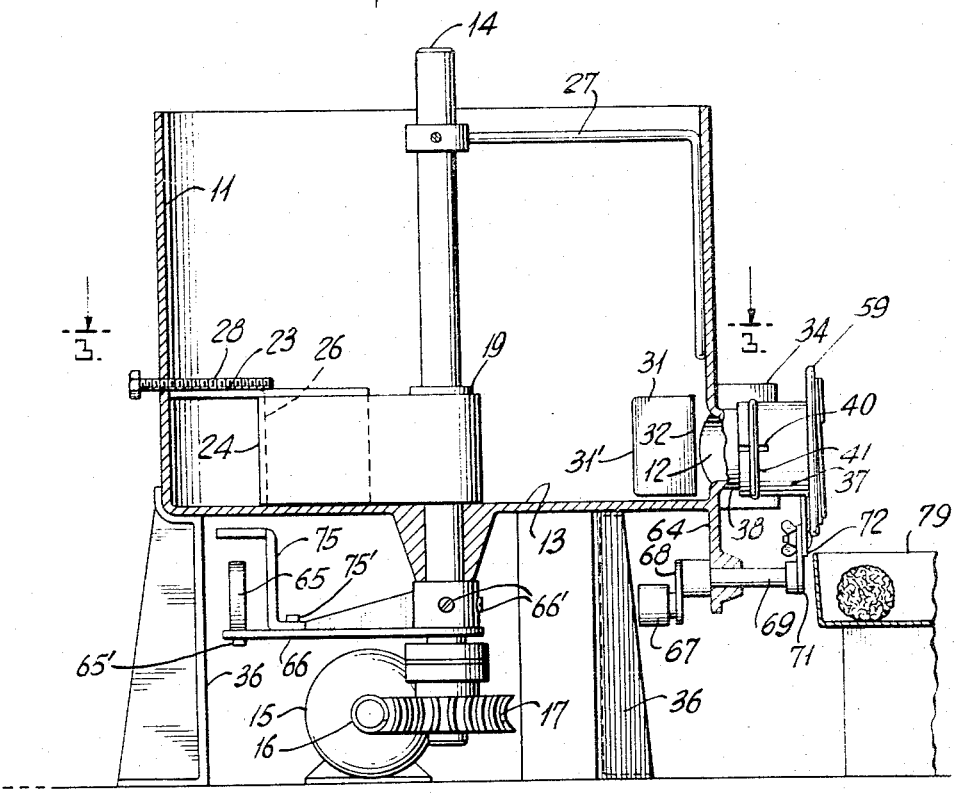

Dec. 20, 1966    J. E. HERRICK    3,292,207
MACHINE FOR AUTOMATICALLY MAKING MEATBALLS AND THE LIKE
Filed June 8, 1964    4 Sheets-Sheet 3
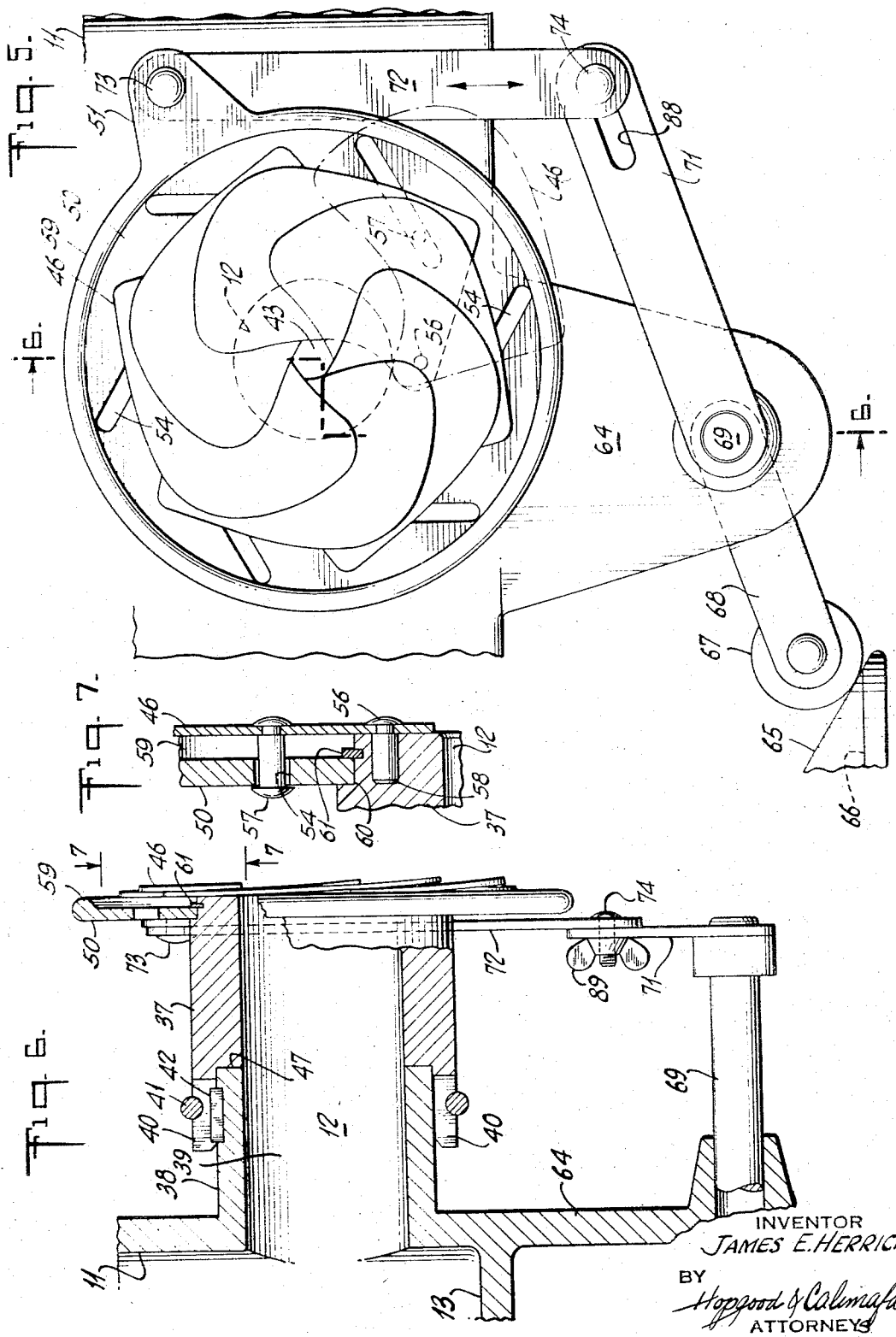
INVENTOR
JAMES E. HERRICK
BY
Hopgood & Calimafde
ATTORNEYS Dec. 20, 1966  J. E. HERRICK  3,292,207
MACHINE FOR AUTOMATICALLY MAKING MEATBALLS AND THE LIKE
Filed June 8, 1964  4 Sheets-Sheet 4

INVENTOR
JAMES E. HERRICK
BY
Hopgood & Calimafde
ATTORNEYS

United States Patent Office 3,292,207
Patented Dec. 20, 1966

3,292,207
MACHINE FOR AUTOMATICALLY MAKING
MEATBALLS AND THE LIKE
James E. Herrick, 24 Ocean Drive W.,
Stamford, Conn. 06902
Filed June 8, 1964, Ser. No. 373,470
17 Claims. (Cl. 17—32)

My invention relates to an improved method and apparatus for shaping ground meat into generally spherical meat patties or relatively flatter meat patties.

I contemplate that my invention may be used by the large producer who packages frozen meat patties as well as the housewife who will make a relatively few number at one time. Further, I believe that a restaurant will have an obvious need for a means for quickly forming such meat patties.

An object of my invention is to provide a method and apparatus for easily shaping ground meat into the form of a meat patty.

A further object of my invention is to provide a method and apparatus for shaping ground meat into a form having a smooth curved surface.

A still further object of my invention is to provide a method and apparatus for continuously producing meat patties of substantially uniform shape.

Still another object of my invention is to provide an apparatus having an improved means for passing ground meat into a forming chamber.

A more specific object of my invention is to provide an improved means for receiving ground meat and sweeping it into the shaping chamber.

Briefly, my invention utilizes a chamber similar to an extrusion chamber in which ground food is passed. As the ground food emerges from the exit orifice of the chamber, means are provided to gradually increase and decrease the area thereof and simultaneously to vary the feed pressure at the exit orifice according to a predetermined pattern. Thus, the food patty as it emerges, has a curved surface whose shape is determined by the pattern of variation in the orifice area and feed pressure. The ground food is first placed in a receiving cylinder or hopper which has an opening communicating with the extrusion chamber. Novel sweeping means are incorporated to sweep the ground food into the extrusion chamber.

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 is a partially cut-away perspective view of my invention;

FIG. 2 is a front sectional view along the vertical plane of the line 2—2 of FIG. 1, also showing the hopper receiving the finished meatball;

FIG. 3 is a top sectional view along the horizontal plane of the line 3—3 of FIG. 2;

FIG. 4 is a side sectional view along the horizontal plane of the line 4—4 of FIG. 1 with certain parts omitted showing the iris and associated control mechanism;

FIG. 5 is a greatly enlarged front view of the iris of FIG. 4;

FIG. 6 is a sectional view along the vertical plane of line 6—6 of FIG. 5;

FIG. 7 is a greatly enlarged fragmentary view of a cross-section of the iris construction of FIG. 6 of the section between 7—7 showing the leaf attachment;

FIG. 8 is an exploded view of the extrusion chamber and shaping means;

FIG. 9 is a front sectional view along the vertical plane of the line 9—9 of FIG. 1;

FIG. 10 shows the shape of the meatball as it leaves the shaping means at consecutive times;

Figure 11A:
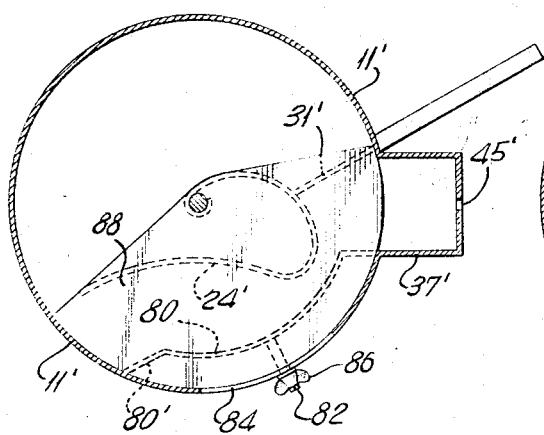
FIG. 11A is a plan view of a second embodiment of the invention at the start of an extrusion cycle.

In general terms, the operation of this invention is based on the novel principle of forcing a quantity of ground meat through an orifice while simultaneously varying the area of the orifice and the feed pressure on the meat forced therethrough according to a predetermined pattern to produce meat patties having a predetermined size and shape. For round meatballs, the orifice area is smoothly varied from a circle of minimum diameter to a circle of maximum diameter and back to a circle of minimum diameter. At the same time, the feed pressure is varied smoothly from minimum to maximum and back to minimum with the feed pressure maximum occurring in phase with the orifice area maximum. For croquettes, the feed pressure and orifice area variations are slightly out of phase, i.e., the feed pressure maximum does not coincide with the orifice area maximum, but rather occurs before or after the orifice area maximum. This elongates one hemisphere of the meatball and flattens the other hemisphere to produce the well known croquette shape.

In the preferred embodiment of the invention, the orifice is located in the side of an open cylindrical chamber which is adapted to receive ground meat. The ground meat is swept past the orifice by a curved vane which, in combination with a movable meat barrier plate, is adapted to produce the desired variation of feed pressure and volume at the orifice. The orifice area is controlled in synchronism with the vane movement by cam means linked to the vane drive means.

Referring now to the drawings, there is shown at FIG. 1 the receiving chamber or cylinder 10 having an opening at the top thereof in which the ground meat may be fed. The chamber comprises side walls 11 and a base 13. An outlet orifice 12 positioned very close to the base 13 is provided in the side walls 11 as shown more fully at FIG. 6.

Chamber 10 has a central shaft 14 extending through the base thereof and being adapted to rotate without rotating the said chamber. A motor 15 is mounted adjacent shaft 14 and is coupled thereto a suitable coupling means shown for example as a worm 16 and gear 17. The gear 17 is fixedly coupled to shaft 14 for rotation.

A sweeping vane 18 (actually a meat pusher) is mounted within chamber 10 and is adapted to rotate relative thereto to push the meat lying on base 13 into the outlet 12. The sweeping vane as shown comprises a flat top plate 23 and an arcuate vertically extending side plate 24 joined to said flat plate. The outer edge 25 of the top plate has a curvature which conforms with that of the side walls 11 of the receiving chamber. The side plate 24 is secured to a collar 19 rigidly coupled to shaft 14 by means of screws 20. The side plate 24 extends from the center of the cylinder or chamber to the side walls and acts as a cam, the rise of which is defined by the curvature such that the distance of any point on said side plate from the center of the chamber increases with its angular relationship. The purpose of this arrangement will be apparent for reasons which will be described later. It is seen that the inner edge 26 of flat plate 23 has a curvature which conforms with that of the side plate 24 at the intersection thereof. Edge 25 contacts side wall 11 but is not secured thereto. The base 13, side wall 11 and sweeping vane 18 form a chamber which will contain any of the meat which rests against base 13.

A wiping vane 27 is secured to shaft 14 and rotates therewith and serves the purpose of removing any meat which may lodge against side walls 11. Similarly, a wiping element such as a screw is positioned just above flat plate 23 and is mounted in side wall 11 and serves to wipe meat which may lodge on the outside surface of flat plate 23.

While motor means are provided to drive shaft 14, it is to be understood that a manual drive means may be provided.

As shown in FIG. 2, the entire chamber 10 may be mounted on suitable stands 36. Further, a hopper unit 79 may be positioned adjacent the exit opening of the machine to receive the formed meatballs.

The formation of the meatball occurs after the ground meat is received in outlet 12. An extrusion chamber 37 is positioned in communicating relationship with outlet 12 and has at the exit end or exit orifice, a means to control the shape of the meatball.

In order to feed the meat into the outlet 12 and through the extrusion chamber 37, a *retractable barrier* plate 31 is positioned within a slit 32 formed in side wall 11.

The retractable barrier 31 is positioned just to the rear of outlet 12. As shown in FIGS. 2 and 9, which are diagrammatic only, the barrier plate 31 is mounted in a housing 34 which contains a biased spring 33. In the normally outward position, the barrier plate has a length L which is somewhat less than the radius of the chamber 10. The length L, however, is adjustable by means of adjustment knob 33', which is threaded into an opening in the back of housing 34, and which serves as a backstop for spring 33. The purpose of this adjustment is to permit variations in the shape or size of the extruded material, as will be explained later. Preferably, the height of the plate is approximately that of the height of side plate 24. As sweeping vane 18 rotates, a portion of it comes in contact with the outer edge 31' of barrier plate 31 and as the rotation of sweeping vane 18 continues, its cam-like action acts to push the plate 31 inwardly until the entire vertical side plate 24 passes thereby. The meat which was located within chamber formed by the sweeping vane is stopped from further movement along base 13 by the barrier plate 31 and, at the same time, is also pushed by the cam-like action of side plate 24 into outlet 12 and into the extrusion chamber.

Referring now to FIGS. 6 and 8 which are to be considered along with FIG. 2, the side walls 11 have a circular flange 38 extending therefrom which serves to define outlet 12. Extrusion chamber 37 is mounted over circular flange 38 in telescopic engagement.

Extrusion chamber 37 has an inlet end 39 having a plurality of longitudinally extending slits 40 (see FIG. 8). End 39 has an internal recess extending a short distance to define a shoulder 47 shown more clearly in FIG. 6 which rests against the outer end of circular flange 38. A key 42 is provided to prevent rotation of chamber 37 relative to flange 38. The entire unit is secured in tight relationship by mans of a snap ring 41 which is accommodated in a peripheral recess provided for in chamber 37.

The exit orifice 43 of the extrusion chamber has an area which may be varied by means of an iris diaphragm 45 which is coupled thereto. The iris diaphragm forms a substantially circular opening, but it is to be understood that suitable masking plates may be used in conjunction with the iris to provide a different shape. For example, masking plates may be used to define a predetermined height of the opening, and therefore the emerging meatball will have a flat top and base.

Referring now to FIGS. 5–8, iris diaphragm 45 which is part of the means for controlling the area of the exit orifice 43 comprises a plurality of interengaging leaves 46. Each leaf comprises two pins, a fixed pin 56 and a movable pin 57 for movement in a slot (see FIG. 5). The fixed pin 56 is secured directly in apertures 58 provided in the exit face 44 of the extrusion chamber 37. The movable pin 57 is received in slots 54 provided in backing plate 50.

Backing plate 50 resembles a collar and has a central opening of a radius R which is approximately equal to the radius at the outer edge or periphery of the exit face 44. This is to insure that the flow of meat through the extrusion chamber is not hampered or blocked by backing plate 50. Backing plate 50 is rotatably mounted on the outer surface of extrusion chamber 37 and is received in a peripheral groove or channel 60 especially provided therefor. A washer or small collar 61 may be provided to retain the backing plate in longitudinally fixed position. Rotation of the backing plate 50 is provided by suitable means which are coupled to an ear 51 extending from the said backing plate.

As shown in FIG. 8, pin 56 may be received in an aperture indicated as 58 while movable pin 57 may be received in slot indicated at 54. In the wide open position, pin 57 is received in the uppermost part of slot 54. When the ear 52 is rotated counterclockwise, pin 57 will be pushed radially inwardly and will pivot about pin 56 to partially close the exit orifice as shown at FIG. 5. A circular bead 59 or flange is provided at the outer periphery of backing plate 50 to partially accommodate the width of some of the leafs.

The mechanism for opening and closing iris diaphragm 45 may be seen by referring to FIGS. 1, 2 and 4. A flange or ear 64 extends downwardly from receiving chamber 10 and has a central aperture therein to receive a rotatable shaft 69. Connected at one end of shaft 69 is an oscillating lever 71 which rotates in accordance with the rotation of shaft 69. An arm 72 is secured to ear 51 by means of pin 73 and to lever 71 by pin 74 as shown in FIG. 5. The rotation of shaft 69 imparts a linear vertical motion to arm 72 to rotate ear 73 thereby opening and closing iris diaphragm 45.

The ear 73 therefore will move from one position which may be considered a minimum position in which the iris diaphragm is closed to a maximum position and then back to a minimum position which movement may be considered as a cycle. As shown in FIG. 10, each cycle of movement is plotted along an axis representing 180 degrees. The shape of the meatball just after the iris diaphragm opens is shown at the zero position. The feed pressure is at a low value at this point because the sweeping vane surface 24 has not yet contacted barrier plate 31 and the pressure due to the vane's rotation is therefore by-passed around the barrier plate. The position at 90 degrees is that of full or maximum opening which opening then corresponds with the desired diameter of the meatball. The feed pressure is at a maximum at this point because the sweeping vane surface 24 is in contact with the barrier plate 31 and the entrapped meat is therefore forced into extrusion chamber 37 as the vane rotates. The 180-degree position shows the meatball completely formed at which time the iris diaphragm will then be closed. The feed pressure has dropped back to a low value at this point because the sweeping vane has reached the end of its travel past extrusion chamber 37. The maximum iris diameter, which determines the diameter of the meatball, can be varied by means of slot 88 and wing nut 89 (FIG. 6), which vary the linkage between arms 71 and 72. Alternately, the maximum diameter may be varied by other known means.

It will also be understood that the timing between the feed pressure maximum and the orifice maximum can be varied by changing the length L of barrier plate 31 so as to control the time at which it makes contact with curved sweeping vane surface 24. It is obvious that the pressure maximum will occur earlier if barrier plate 31 is extended further into cylinder 10 and that the pressure maximum will occur later if barrier plate 31 is retracted into its housing 34. This variation in the length L of barrier plate 31 is accomplished by turning adjustment knob 33' until the desired shape is produced. It should be noted too that the adjustment of length L also changes the total volume extruded, and that adjustment knob 33' can therefore be used to change the size of the meatball if means are provided to compensate for the phase variation induced by the change of length. Such means are provided in this embodiment, as will be explained later.

The above described variation is caused by the interaction between vane 24 and barrier 31. The vane 24 is shaped so that a clearance exists between it and barrier 31 at the beginning of the extrusion cycle. This provides a by-pass for material entrapped within the vane and allows it to freely escape by moving through the by-pass opening, thereby reducing the feed pressure to a low level.

As vane 24 rotates, the cross-sectional by-pass area between the vane and barrier 31 decreases by a predetermined amount due to the curve of vane 24, thereby producing a predetermined increase in the feed pressure. As the by-pass area decreases, the feed pressure will increase smoothly and reach a maximum when the by-pass area is reduced to zero, i.e., when barrier 31 contacts vane 24. After the contact is made, the feed pressure is determined by the volume of material displaced by the rotary motion of the vane. Since the cross-sectional area of the entrapped material decreases smoothly as the vane rotates, the volume of material displaced by the rotation will correspondingly decrease, thereby smoothly reducing the feed pressure from its maximum point back to a low value when the trailing edge of vane 24 reaches the extrusion chamber 37. In terms of the diagram in FIG. 10, the barrier 31 contacts vane 24 at the 90-degree position of the extrusion cycle, which corresponds to the full open position of the iris, and the trailing edge of the vane 24 reaches the extrusion chamber at the 180-degree position, which corresponds to the fully closed position of the iris. Thus the feed pressure maximum and minimum points are synchronized with the orifice area maximum and minimum points to produce a spherical extrusion.

From the foregoing description, it will be clear that the pressure variation in the first half of the extrusion cycle (0 to 90 degrees in FIG. 10) is caused by a variation in the by-pass area between vanes 24 and barrier 31, and that the pressure variation in the second half of the extrusion cycle (90 to 180 degrees in FIG. 10) is caused by a variation in the cross-sectional area of the entrapped material. Both of these variations, however, are determined by the curve of vane 24 and the length and placement of barrier 31. By appropriate adjustment of these variables, any desired feed-pressure function can be obtained, as will be apparent to those skilled in the art.

As shown in FIGS. 1 and 2, the mechanism for rotating shaft 69 comprises a cam 65 mounted on an arm 66 which is fixedly secured to shaft 14 for rotation therewith. Arm 66 is secured to shaft 14 by means of set-screws 66', which permit the angular position of arm 66 to be varied with respect to shaft 14. Cam 65 is secured to arm 66 by screws 65' (FIGS. 2 and 4) so that it can be removed and replaced by a different shaped cam when desired. Cam 65 has a gradual rise and fall which controls the opening and closing of iris diaphragm 45. A cam follower 67 is rigidly coupled to a crank arm 68 which is rotatably coupled to shaft 69.

When cam 65 is rotated, the leading edge of the rise pushes upwardly against cam follower 67 to rotate crank arm 68. As previously described, this serves to open iris diaphragm 45. In order to insure that the cam follower 67 follows the fall of cam 65 a positive following plate 75 may be secured to arm 66 by screws 75' and positioned in space apart relationship with the rise and fall or just the fall of cam 65. Preferably, its curvature should conform with that of the fall of cam 65 and should be spaced a sufficient distance to receive cam follower 67.

It will be obvious that any desired orifice area function can be generated by providing the appropriate shape for cam 65 and that cam 65 can be detached and replaced by a different cam to produce a meat patty of some other shape. It will also be obvious that the timing between the feed pressure maximum and the orifice maximum can be varied by changing the angular position of arm 66 with respect to shaft 14. This has the same effect on the timing as changing the length of barrier plate 31. In this particular embodiment, however, the length of the barrier plate is used to control the volume of the extrusion, i.e., the size of the meatball, while the angular position of arm 66 is used to control the shape of the meatball by adjusting the timing between the orifice area maximum and the feed pressure maximum. In this case, the arm 66 can be used to compensate for changes of timing that would otherwise occur when the length of barrier plate 31 is changed.

As shown, the internal diameter of the extrusion chamber 37 is constant. However, other means may be utilized for varying the effective internal diameter.

Figure 11B:
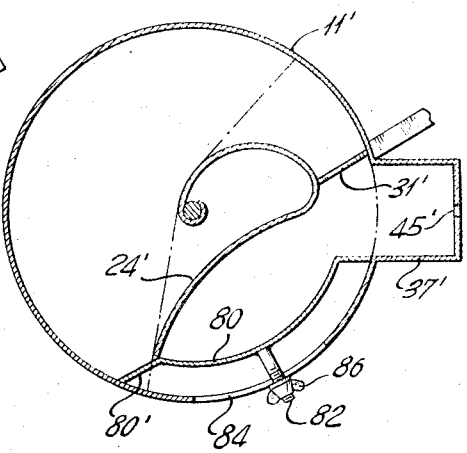
FIG. 11B shows the embodiment of FIG. 11A at the quarter point of the extrusion cycle.
Figure 11C:
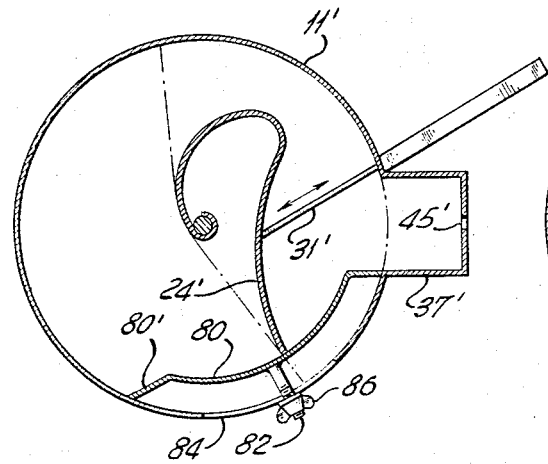
FIG. 11C shows the embodiment of FIG. 11A at the midpoint of an extrusion cycle.

FIGS. 11A, 11B, 11C and 11D show a different vane configuration wherein the by-pass function is performed by the trailing edge of the vane rather than by its leading edge. In addition to a curved vane 24' and a retractable barrier 31', this embodiment also includes an abutment member 80, which is attached by a bolt 82 to the inside of side wall 11', and whose function will become apparent from the description which follows. FIG. 11A shows the angular position of vane 24' at the start of the extrusion cycle, i.e., at the 0-degree position of FIG. 10. At this point, barrier 31' is in contact with vane 24', and the by-pass area is defined by the space separating the trailing edge of vane 24' and the leading edge 80' of abutment 80. At this point the feed pressure is low due to the by-pass area. As the vane rotates, the by-pass area decreases, thereby providing a smooth buildup of the feed pressure. At approximately 45 degrees in the extrusion cycle, the by-pass area is reduced to zero, as indicated in FIG. 11B, due to the fact that the trailing edge of vane 24' has contacted abutment 80. At this point the feed pressure ceases to be determined by the by-pass area and becomes dependent on the cross-sectional area of the entrapped material. In this particular embodiment, however, the feed pressure does not reach a maximum when the by-pass area is reduced to zero, but rather continues to increase because of the inverted curve of vane 24'. The inverted curve causes the cross-sectional area of the entrapped material to increase as vane 24' rotates beyond the point shown in FIG. 11B, thereby increasing the volume of material urged into the extrusion chamber, and correspondingly increasing the feed pressure. The feed pressure continues to increase until vane 24' reaches the position shown in FIG. 11C, which represents the maximum feed pressure point, and corresponds to the 90-degree point of the extrusion cycle shown in FIG. 10.

Figure 11D:
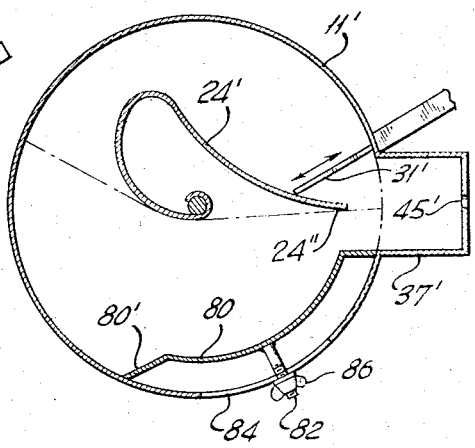
FIG. 11D shows the embodiment of FIG. 11A at the end of an extrusion cycle.

As vane 24' continues to rotate, the cross-sectional area of the entrapped volume decreases, thereby smoothly reducing the feed pressure until it reaches the initial low value it started at. This occurs when the trailing edge 24" of vane 24' is opposite extrusion chamber 37' as shown in FIG. 11D, which corresponds to the 180-degree point of the extrusion cycle shown in FIG. 10. In this embodiment of the invention, the area of orifice 45' is varied in synchronism with the above described extrusion cycle by means which are not shown but which can be identical to the previously described iris and cam means. From the differences between the extrusion cycle of the first and second embodiments of the invention, it will be clear that this invention is not limited to any particular means of producing the variable feed pressure which is essential in producing spherical meatballs. The required variation of feed pressure can be produced by a variable by-pass area, or by a variable volume of entrapped material, or by any other suitable means. It should be understood, however, that "feed pressure" means the pressure at the exit orifice rather than at any other point in the entrapped material. Since the material is plastic in nature, the pressure will in general be equal throughout the entrapped volume, but under some circumstances there will be differences of pressure.

Figure 12:
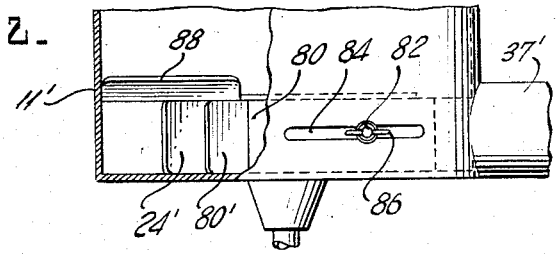
FIG. 12 is an elevation view of the embodiment shown in FIGS. 11A through 11D.

FIG. 12 is a plan view of the embodiment shown in FIGS. 11A through 11D. As shown in FIG. 12, the position of abutment member 80 is preferably adjustable by means of a slit 84 in side wall 11'. Bolt 82, which secures abutment member 80 to side wall 11', extends through slit 84 and is secured thereto by means of wing nut 86. By loosening wing nut 86, the operator can slide bolt 82 to any desired position to adjust the position of abutment member 80 with respect to the vane and orifice. This adjustment changes the phase relationship between the feed-pressure function and the orifice area function in the same way that the adjustment of the barrier length changed the phase relationships in the first mentioned embodiment. To facilitate this adjustment a scale is preferably marked on the outside of side wall 11' under bolt 82. It will also be apparent to those skilled in the art that the abutment member 80 could also be adjustable in depth as well as in position.

Also, as shown in FIG. 12, the top edge 88 of vane 24' is preferably bent upwards at its leading edge to help force the material downward as the vane rotates to ensure a solid, uniform mass of entrapped material. This feature is not essential to the invention, but it is preferable in small machines where the material has a tendency to stick to the sides of the pot instead of falling down in front of the vane.

Various types of iris diaphragms may be utilized to effect the variation in exit orifice diameter. Other variations of the embodiments of this invention will occur to those skilled in the art which will be within the principles I have just described. For example, a different curve may be given to curved sweeping vane surface 24 instead of the two curves shown in order to produce different pressure functions and different feed volume functions. Furthermore, although the feed pressure is generated by a rotating vane structure in the disclosed embodiments, it could also be generated by other means. Any feed means which generates the desired feed pressure and volume functions can be used in connection with this invention. These and many other modifications of the invention will be apparent to those skilled in the art and this invention includes all modifications falling within the scope of the following claims.

What is claimed is:

1. An apparatus for shaping food patties having a plastic-like consistency comprising a receiving chamber in which food may be placed and having an opening through which food may be extruded, said opening being variable in area, means for applying a variable pressure to said food, extrusion means coupled to said chamber and communicating with said opening to receive said food and to extrude it out of an exit opening thereof, means for varying the area of said exit opening.

2. A method of shaping food patties from food in a generally shapable and moldable form comprising the steps of passing said food through a chamber having an exit orifice of variable area, gradually increasing and thereafter decreasing the area of said orifice, and simultaneously gradually increasing and thereafter decreasing the pressure applied to said food while said food passes through said chamber whereby the pressure of said food increases at said orifice.

3. An apparatus for shaping food patties having a plastic-like consistency comprising a receiving chamber having an outlet, sweeping means in said chamber to sweep the food into said outlet, a retractable barrier plate positioned in the path of said sweeping means, and an extrusion chamber coupled to said receiving chamber and being coupled for communicating with said receiving chamber outlet, said extrusion chamber having a variable exit orifice.

4. An apparatus for shaping food patties having plastic-like consistency comprising a receiving chamber in which food may be placed, said receiving chamber having an outlet, extruding means having an opening communication with said chamber through said outlet and through which food may be extruded, a cyclically variable exit orifice varying the area of the exit opening, and means for coordinately varying the pressure applied to said food in said receiving chamber as it is passed through said outlet of said receiving chamber while varying the area of said extruded opening.

5. The apparatus of claim 4 in which said pressure varying means includes a sweeping vane and a retractable barrier plate in the path of said sweeping vane.

6. The apparatus of claim 3 in which the contour of said sweeping vane is curved so as to define a cam surface which is generally perpendicular to the base of the receiving chamber, said vane having a top surface which together with said retractable barrier plate define a variable volume chamber.

7. A method of shaping patties from food comprising the steps of feeding a quantity of food into a meat holding chamber having an exit orifice, sweeping said food through the chamber to the exit orifice and simultaneously variably controlling the area of said exit orifice and cyclically and coordinately varying the pressure applied to the food by the sweeping action.

8. The method according to claim 7, wherein the area and pressure vary directly.

9. The method according to claim 8, wherein the area maximum lags the pressure maximum.

10. An apparatus for shaping food patties having a plastic-like consistency comprising a receiving chamber in which said food may be placed, extruding means having an opening communicating with said chamber through which said food may be extruded, means for variably applying pressure to said food to extrude it through said opening, a retractable barrier means positioned in said chamber in the path of pressure applying means, said extrusion means having an exit opening, and means coupled to said extrusion means for cyclically adjusting the area of said exit opening whereby the pressure applied to said food at said exit opening varies in accordance with the aforesaid variable pressure.

11. An apparatus for shaping food patties having a plastic-like consistency comprising a receiving chamber in which said food may be placed having an opening communicating therein, an extrusion chamber having an inlet aperture communicating with said opening and an exit aperture, sweeping means within said receiving chamber defining a food containing chamber including means to vary the volume of said receiving chamber positioned to move across said opening, retractable barrier means positioned in the path of said sweeping means, rotating means to rotate said sweeping means to urge said food into said opening, area control means coupled to said extrusion chamber and said rotating means responsive to the position of said rotating means to cyclically vary the area of said exit aperture, and pressure control means coupled to said sweeping means to cyclically vary the pressure applied to said food at said exit aperture.

12. An apparatus for shaping food patties having a plastic-like consistency comprising a receiving chamber in which said food may be placed having an opening therein, an extrusion chamber having an inlet aperture communicating with said opening and an exit aperture, sweeping means within said receiving chamber defining a food containing chamber positioned to move across said opening, rotating means to rotate said sweeping means to urge said food into said opening, area control means coupled to said extrusion chamber, said area control means responsive to the position of said rotating means to cyclically vary the area of said exit aperture, said sweeping means having a cam surface with a gradual rise, and a retractable barrier plate positioned adjacent to said second opening in the path of said sweeping means, said barrier plate being retractable upon the action of said cam surface, said cam surface and barrier plate being operable to cyclically vary the pressure applied to said food at said exit aperture.

13. The apparatus of claim 12 in which said chamber has a slit adjacent said opening, said barrier plate passing through said slit, and means biasing said barrier plate adjacent and to the rear of said opening.

14. The apparatus of claim 11 in which a predetermined space exists between the cam surface and the barrier plate at predetermined times during the cycle of operation whereby said opening serves to release the aforesaid pressure.

15. The apparatus of claim 11 in which said sweeping means comprises a vane which co-acts with the barrier plate only during predetermined times in the cycle of operation.

16. In an apparatus for forming spherical food patties comprising extrusion means for extruding food through a round orifice whose diameter is cyclically varied from a small value to a maximum value and back to a small value, means for cyclically varying the pressure applied to said food at said exit orifice from a low value to a maximum value and back to a low value in synchronism with the variation of said orifice diameter, whereby the pressure of the meat varies internally of the food patty.

17. In an apparatus for forming croquette shaped food patties comprising extrusion means for extruding food through a round orifice whose diameter is cyclically varied from a small value to a maximum value and back to a small value, means for cyclically and coordinately varying the pressure applied to said food at said exit orifice from a low value to a maximum value and back to a low value, with the maximum value of said pressure occurring at a different time from the maximum value of said diameter, whereby the pressure of the meat varies internally of the food patty.

References Cited by the Examiner

UNITED STATES PATENTS

| | | | |
|---|---|---|---|
| 2,702,405 | 2/1955 | Garfunkel | 17—32 |
| 2,793,598 | 5/1957 | Rivoche | 107—14 |
| 3,061,872 | 11/1962 | Holly | 17—32 |
| 3,158,895 | 12/1964 | Hilgeland | 17—32 |

SAMUEL KOREN, *Primary Examiner.*

LUCIE H. LAUDENSLAGER, *Examiner.*